United States Patent [19]

Neefe

[11] 4,280,759
[45] Jul. 28, 1981

[54] PERMEABLE WETTABLE CONTACT LENS

[76] Inventor: Charles W. Neefe, P.O. Box 429, Big Spring, Tex. 79720

[21] Appl. No.: 139,849

[22] Filed: Apr. 14, 1980

[51] Int. Cl.³ .............................................. G02C 7/04
[52] U.S. Cl. ............................................... 351/160 R
[58] Field of Search ....................... 351/160 H, 160 R

[56] References Cited

U.S. PATENT DOCUMENTS

| | | | |
|---|---|---|---|
| 3,808,178 | 4/1974 | Gaylord | 351/160 H X |
| 4,139,513 | 2/1979 | Tanaka et al. | 351/160 H X |
| 4,139,692 | 2/1979 | Tanaka et al. | 351/160 H X |
| 4,152,508 | 5/1979 | Ellis et al. | 351/160 H X |
| 4,216,303 | 8/1980 | Novicky | 351/160 H X |

Primary Examiner—John K. Corbin
Assistant Examiner—Scott J. Sugarman

[57] ABSTRACT

The permeability of a silane copolymer is increased and the surface wetting properties improved if the silane is polymerized before being mixed with the comononer and before the copolymerization.

2 Claims, 2 Drawing Figures

PERMEABLE WETTABLE CONTACT LENS

RELATED APPLICATIONS

U.S. Pat. No. 4,163,608 discloses a permeable hydrated methylmethacrylate.

U.S. Pat. No. 4,110,264 discloses a permeable polymethylmethacrylate.

U.S. Pat. No. 3,803,093 discloses a material composed of methylmethacrylate, N-(1,1-dimethyl-3-oxobutyl) acrylamide and acrylic acid.

U.S. Pat. No. 3,900,250 discloses a semi-ridged gas permeable contact lens composed of cellulose acetate butyrate.

U.S. Pat. No. 3,984,485 discloses a material for contact lenses composed of methylmethacrylate, N-(1,1-dimethyl-3-oxobutyl) acrylamide.

U.S. Pat. No. 3,965,063 filed June 30, 1975 discloses a contact lens material composed of hydroxyethyl methacrylate and N-(1,1-dimethyl-3-oxobutyl) acrylamide, ethylene glycol monomethacrylate known as hydroxyethyl methacrylate, methylmethacrylate and a crosslinker ethylene glycol dimethacrylate.

THE PRIOR ART

Contact lenses that are being used at this time depend upon the flow of lachrymal fluids around the edge of the lens to supply the cornea with it's necessary oxygen. The cornea tissue maintains a temperature much lower than the other body tissues. This is due to evaporation at the corneal surface, and the lack of blood supply to the cornea which warms the rest of the body. The temperature of the cornea must be at this lower level or it's metabolic processes will be accelerated. The plastic now being used for fabricating contact lenses is a very poor conductor of heat. This insulating material covering a large percent of the corneal area raises it's temperature which increases the chemical activity of the metabolic processes and the cornea demands more oxygen to maintain normal metabolism. The present lenses prelude the free exchange of atmospheric oxygen dissolved in the precorneal fluid from reaching the corneal tissue. The result is edema and epithelium disorganization.

Lenses have been made with small holes drilled through the lens in an effort to overcome this problem. If the holes are large, they will be seen by the wearer, and if small enough not to be seen, they become clogged with body secretions and are rendered useless.

The present contact lenses are of two types: the soft hydrophilic and the hard hydrophobic. The soft hydrophilic lenses are currently made from cross-linked ethylene glycol monomethacrylate. The hard hydrophobic lenses are currently made from polymethylmethacrylate. The soft hydrophilic lenses are kept sterile by boiling because they tend to absorb antimicrobial agents such as benzalkonium chloride and bind the antimicrobial agents into the lens structure and the lens becomes toxic to the ocular tissue. The hard lenses made from methylmethacrylate do not absorb these antimicrobia agents and therefore may be stored in and cleaned with solutions containing preservatives such as benzalkonium chloride. Lenses made from methylmethacrylate are very hydrophobic and a wetting agent is required for the water to form a smooth layer on the surface of the lens. If no wetting solution is used the water will form beads or droplets on the surface and prevent the lens from forming an image. The contact angle for methylmethacrylate is 60°. A wetting agent will lower the wetting or contact angle to approximately 30° which is within range of acceptability.

The plastic herein disclosed has a water contact angle of 18° when hydrated. This provides a greater degree of confort for the wearer and a reduction in surface friction and less foreign body sensation to the eye.

SUMMARY OF THE INVENTION

According to the invention, a contact lens is provided which is made of a transparent permeable material which will provide gaseous exchange of both oxygen and carbon dioxide, through the transparent permeable lens, to the outer surface of the lens in contact with the atmosphere. It is preferred that at least a portion of the lens have a thickness of no greater than one-thousandth of an inch to thereby provide maximum gaseous exchange through the transparent permeable lens.

The new and greatly improved contact lens material of this invention overcomes these disadvantages by allowing the gases to enter the material from which the lens is made. Dissolved gases can pass through the lens by diffusion. This exchange is slow, but it must be remembered that the metabolic processes of the corneas are slow.

Present corneal contact lenses must be fitted with the peripheral zone flatter than the cornea in order to provide lachrymal flow and oxygen to the apex of the cornea. This clearance created around the edge allows the lens to move about the cornea and may be forced off center by the action of the upper lid, also lid sensation and discomfort result from edge stand off. With the present corneal contact lenses, no fixed alignment between the optical center of the contact lens and eye is possible.

This new permeable lens allows the dissolved gases to pass through the lens material; therefore, the lens may be fitted in contact with the corneal surface from center to edge. The corneal surface is not spherical therefore no movement of the lens will be possible if an aspheric lens is in contact with the cornea from center to edge. This permeable flow differs from passage through holes drilled in the lens in that the atmospheric gases dissolve into the molecular structure of the lens and diffuses into and permeates the lens structure.

This new lens design may be employed as a therapeutic device by adding the required medication to the lens material. The medication will be dissolved slowly by the lachrymal fluids and find it's way to the corneal tissue by diffusion to the surface of the lens. With this lens, long-lasting and highly effective medications are possible.

DESCRIPTION OF THE DRAWINGS

This invention can be more easily understood from a study of the drawing in which.

Figure 1:
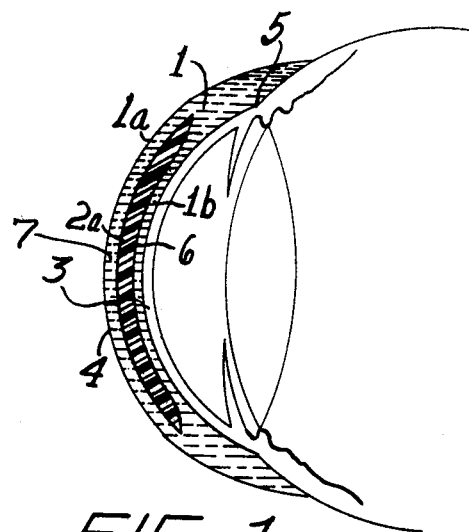
FIG. 1 is a cross sectional view of the gas permeable contact lens of this invention in place on the cornea, having a positive refraction power and being of the size smaller than the cornea.
Figure 2:
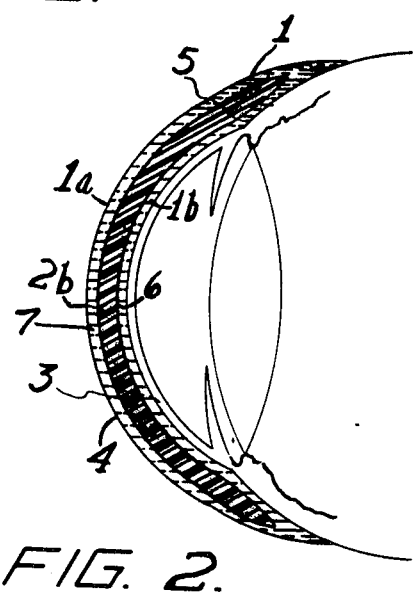
FIG. 2 is a cross sectional view of the gas permeable contact lens of this invention in place on the cornea, and having a positive refraction power and a size larger than the cornea. The larger size makes this lens an excellent post-operative dressing. For this purpose, the thickness may be increased to provide an even pressure to all parts of the cornea.

It is noted that with exception of lenses 2a and 2b, respectively, the various parts and features having similar functions which are shown in FIGS. 1 and 2, are referred to with the same characters. Lenses 2a and 2b illustrate transparent permeable contact lenses having positive refractive powers. Lens 2b differs from lens 2a in that the outer periphery thereof rests on area 5 (FIG. 2) which is outside the limbus. Lens 2b is useful as a post-operative dressing for corneal surgical cases. Lens 2a is a similar transparent permeable lens, except it is thinner at its periphery. In all other respects the lenses are similar bodies. A concave inner corneal surface 6 is shaped to lie upon and conform to the curvature of the cornea 3. The lachrymal film 1 surrounds the respective lens and covers the surface of the corena. Film 1a covers anterior surface and is in contact with the atmosphere 4 and film 1b contact posterior surface 6 and the corneal surface.

The oxygen consumption rate of the human cornea is approximated to be $2.81/cm^2$-hr. This value has been determined by Jauregui and Fatt, "Estimation of the Vivo Oxygen Consumption of the Human Corneal Epithelium," in the American Journal of Optometry and Archives of American Academy of Optometry, June 1972, page 507.

DESCRIPTION OF THE PREFERRED EMBODIMENT

The permeable silane-methacrylate copolymer is made as follows: 100 milliliter of a reactive vinyl such as monomeric methylmethacrylate is placed in a holding flask. 2 to 150 milliliter of a reactive organosilane such as Y-methacryloxypropyltrimethoxysilane ($CH_2$=$C(CH_3)CO_2(CH_2)_3Si(OCH_3)_3$) having a molecular weight of 196.3 is placed in a second vessel and heated to 80° C. and a catalyst such as benzoyl peroxide 0.50% by weight of the Y-methacryloxypropyltrimethoxysilane is slowly added. Stirring is continued until polymerization is noted by a slight increase in viscosity. The temperature is reduced to 50° C. and the silane is allowed to thicken to a syrup state. The polymerized silane syrup containing large molecules is slowly added to the monomeric methylmethacrylate monomer and thoroughly mixed. The mixture is purged of atmospheric oxygen and placed under a nitrogen blanket. The mixture is placed in glass tubes 14 m/m in diameter and 160 m/m long. The filled and sealed tubes are placed in a water bath at 55° C. for 24 hours.

The material polymerizes to form clear rods. The glass tubes are removed and the material is post cured at 70° C. for 12 hours. The rods are turned to 0.50 inch diameter in an atlas lathe. The 0.50 inch rods are hand cut into 0.25 inch thick discs and made into contact lenses by methods well known to the art. The finished lens are placed on the cornea of the eye.

I claim:

1. An oxygen permeable contact lens, having a wettable surface concave-convex in form of an optically clear permeable copolymer, made by the steps of adding 100 parts by volume monomeric methylmethacrylate to 2 to 150 parts by volume of a syrup composed of polymerized reactive organosilane, allowing the mixture to further polymerize to form a clear solid from which a contact lens having increased oxygen permeability and improved surface wetting is made by methods well known to the art.

2. A lens as in claim 1 wherein the reactive organosilane is a partially polymerized syrup when added to the monomeric methylmethacrylate.

* * * * *